United States Patent
Yoon et al.

(10) Patent No.: US 11,308,653 B2
(45) Date of Patent: Apr. 19, 2022

(54) ELECTRONIC DEVICE AND METHOD FOR PROVIDING AUGMENTED REALITY SERVICE BASED ON A USER OF ELECTRONIC DEVICE

(71) Applicant: Samsung Electronics Co., Ltd., Gyeonggi-do (KR)

(72) Inventors: Yeo Jun Yoon, Seoul (KR); Ji Yeon Kwak, Seoul (KR); Rae Kyoung Lee, Gyeonggi-do (KR); Eun Joo Mo, Gyeonggi-do (KR); Jae Ik Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/761,988

(22) PCT Filed: Aug. 29, 2018

(86) PCT No.: PCT/KR2018/009936
§ 371 (c)(1),
(2) Date: May 6, 2020

(87) PCT Pub. No.: WO2019/103285
PCT Pub. Date: May 31, 2019

(65) Prior Publication Data
US 2020/0265613 A1 Aug. 20, 2020

(30) Foreign Application Priority Data
Nov. 23, 2017 (KR) .................... 10-2017-0157425

(51) Int. Cl.
*G06T 11/00* (2006.01)
*G06K 9/00* (2022.01)
(Continued)

(52) U.S. Cl.
CPC ............ *G06T 11/00* (2013.01); *G06K 9/6201* (2013.01); *G06K 9/628* (2013.01); *G06V 20/20* (2022.01); *G06V 20/70* (2022.01); *G06T 2200/24* (2013.01)

(58) Field of Classification Search
CPC ........... G06K 9/00671; G06K 9/00288; G06K 9/00684; G06K 9/22; G06K 9/6201;
(Continued)

(56) References Cited

U.S. PATENT DOCUMENTS 9,329,052 B2 5/2016 Varanasi et al.
10,323,952 B2 6/2019 Li et al.
(Continued)

FOREIGN PATENT DOCUMENTS

KR 10-2012-0086064 A 8/2012
KR 10-1292083 B1 8/2013
(Continued)

OTHER PUBLICATIONS

Korean Search Report dated Nov. 22, 2021.

*Primary Examiner* — Jin Cheng Wang
(74) *Attorney, Agent, or Firm* — Cha & Reiter, LLC.

(57) ABSTRACT

An electronic device is disclosed. The electronic device according to an embodiment disclosed in the disclosure includes a camera, a display, a memory storing a plurality of captured images and preference information for each captured image, and a processor operatively connected to the camera, the display, and the memory, wherein the processor obtains a live view image using the camera, determines at least one image of which a preference is relatively high among the plurality of captured images as additional information of an augmented reality service based on at least one of the preference information or an object included in the
(Continued)

live view image, and displays the additional information and the live view image on the display.

15 Claims, 14 Drawing Sheets

(51) Int. Cl.
  *G06K 9/62* (2022.01)
  *G06V 20/20* (2022.01)
  *G06V 20/70* (2022.01)

(58) Field of Classification Search
  CPC ....... G06K 9/628; G06T 19/006; G06T 11/00; G06T 19/20; G06T 2200/04; G06T 2200/24; G06T 2219/004; G06T 2207/20101; G06T 2215/16
  See application file for complete search history.

(56) References Cited

U.S. PATENT DOCUMENTS

| | | | |
|---|---|---|---|
| 10,354,425 B2 | 7/2019 | Yan et al. | |
| 2010/0313113 A1* | 12/2010 | Chen | G06T 19/006 715/230 |
| 2011/0319130 A1* | 12/2011 | Lee | G06T 19/006 455/556.1 |
| 2012/0190346 A1 | 7/2012 | Kim | |
| 2012/0327119 A1* | 12/2012 | Woo | G06F 16/435 345/633 |
| 2013/0222612 A1* | 8/2013 | Sako | H04N 5/23206 348/207.1 |
| 2013/0229535 A1* | 9/2013 | Nakamura | H04N 5/225 348/207.1 |
| 2013/0239163 A1 | 9/2013 | Kim et al. | |
| 2013/0329060 A1* | 12/2013 | Yim | G06F 16/50 348/207.1 |
| 2014/0058825 A1* | 2/2014 | Raman | G06Q 30/02 705/14.42 |
| 2014/0362111 A1* | 12/2014 | Kim | G06T 19/006 345/633 |
| 2015/0156536 A1 | 6/2015 | Kim et al. | |
| 2015/0262428 A1* | 9/2015 | Tatzgern | G06T 11/00 345/633 |
| 2016/0188674 A1 | 6/2016 | Han | |
| 2016/0330522 A1* | 11/2016 | Newell | G06F 21/604 |
| 2017/0064198 A1* | 3/2017 | Chen | G06K 9/66 |
| 2017/0094160 A1* | 3/2017 | Bostick | H04N 5/23222 |
| 2019/0156393 A1* | 5/2019 | Yankovich | G06Q 30/0631 |
| 2020/0264007 A1* | 8/2020 | Yoo | G06T 19/006 |

FOREIGN PATENT DOCUMENTS

| | | |
|---|---|---|
| KR | 10-2014-0094629 A | 7/2014 |
| KR | 10-2016-0082168 A | 7/2016 |
| KR | 10-2017-0090392 A | 8/2017 |
| KR | 10-2017-0122092 A | 11/2017 |
| WO | 2017/106529 A1 | 6/2017 |

* cited by examiner

[PHOTO IMAGE : TOTAL ANALYSIS RESULT OF PHOTO ALBUM]
A User(30%), B User(20%)
DOLL (20%), COFFEE-RELATED (15%)

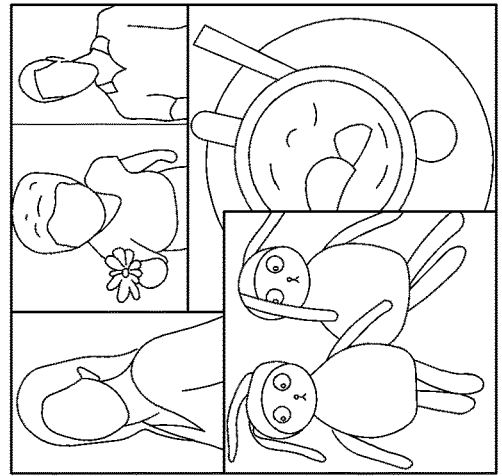

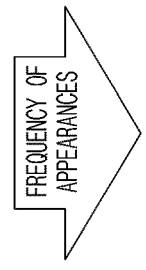
FREQUENCY OF APPEARANCES

USER A : USER B : DOLL : COFFEE : OTHER
= 0.3 : 0.2 : 0.2 : 0.15 : 0.15

[IMAGES WITH SHARED HISTORY]
PHOTOS OF DOLLS (3%) UPLOADED TO HANDMADE-DOLL CLUB
DOLL-RELATED CONTENT (2%) AMONG PHOTOS SHARED WITH FRIENDS

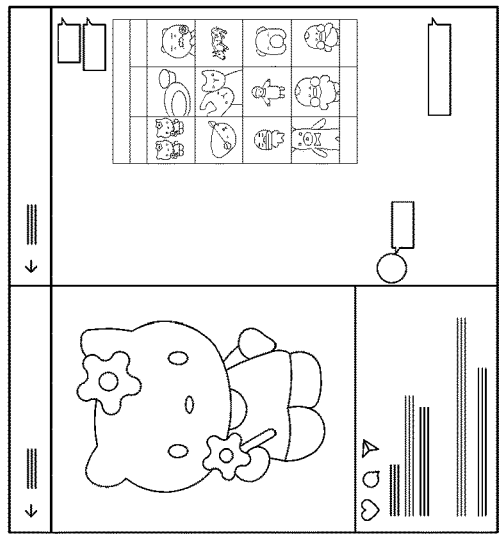

DOLL 0.05 * 10(WEIGHT VALUE) = 0.5

[IMAGES CREATED BY SCREEN CAPTURE]
PHOTOS (1%) THAT ARE CREATED BY
CAPTURING CONTENTS OF OTHERS OF DOLL CLUB

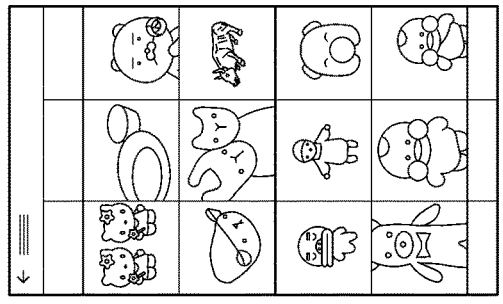

DOLL 0.01 * 20(WEIGHT VALUE) = 0.2

PREFERENCE OF DOLL CATEGORY IS 0.2 + 0.5 + 0.2 = 0.9, AND PREFERENCE OF DOLL CATEGORY IS THE HIGHEST

FIG. 4

WHEN USER WHO TOOK A LOT OF
BRUNCH PHOTOS IN LATE MORNING ON
WEEKEND EXECUTES AR VIEW IN
CORRESPONDING REGION AT SAME TIME OF DAY
-> PROVIDE BRUNCH MENU PROMOTION INFORMATION

INFORMATION SHOWN TO USER WHO TOOK A LOT OF
COFFEE PHOTOS ON RAINY MONDAY MORNING
-> PROVIDE HOT COFFEE DRINK
   HISTORY PROMOTION INFORMATION

ELECTRONIC DEVICE AND METHOD FOR PROVIDING AUGMENTED REALITY SERVICE BASED ON A USER OF ELECTRONIC DEVICE

CROSS REFERENCE TO RELATED APPLICATIONS

This application is a National Phase Entry of PCT International Application No. PCT/KR2018/009936, which was filed on Aug. 29, 2018, and claims a priority to Korean Patent Application No. 10-2017-0157425, which was filed on Nov. 23, 2017, the contents of which are incorporated herein by reference.

TECHNICAL FIELD

Embodiments disclosed in the disclosure relates to a technology of an augmented reality service.

BACKGROUND ART

Augmented reality (AR), which is a technology that overlaps a virtual object on a real world viewed by a user using eyes thereof, is also referred to as mixed reality. The augmented reality technology shows a mixture of the real environment and the virtual object, thereby increasing a sense of reality of the virtual object (or additional information).

An electronic device may overlap the additional information on a live view image (the real world) obtained using a camera and display the overlapped additional information and live view image on a display. For example, the electronic device may identify current location information of the electronic device, obtain the current location information as the additional information, and display the additional information and the live view image on the display.

DISCLOSURE

Technical Problem

The additional information may be provided from, for example, a service providing server. The service providing server provides the same additional information to electronic devices at the same location, so that the electronic devices at the same location may receive the same additional information. Further, because a place visited by a user is limited, additional information provided by the electronic device may be limited. Therefore, as the user repeatedly uses an augmented reality service, the user may lose interest.

Various embodiments disclosed in the disclosure provide an electronic device capable of providing an augmented reality service based on a user's taste, and a method for providing the augmented reality service of the electronic device.

Technical Solution

An aspect of the disclosure provides an electronic device including a camera, a display, a memory storing a plurality of captured images and preference information for each captured image, and a processor operatively connected to the camera, the display, and the memory, wherein the processor obtains a live view image using the camera, determines at least one image of which a preference is relatively high among the plurality of captured images as additional information of an augmented reality service based on at least one of the preference information or an object included in the live view image, and displays the additional information and the live view image on the display.

Another aspect of the disclosure provides a method for providing an augmented reality service by an electronic device including obtaining a live view image using a camera, determining at least one image of which a preference is relatively among a plurality of captured images based on at least one of preference information for the plurality of captured images stored in a memory or an object included in the live view image, and displaying the at least one image and the live view image on a display.

Advantageous Effects

According to embodiments disclosed in the disclosure, an augmented reality service based on a user's taste may be provided. In addition, various effects that may be directly or indirectly identified through the disclosure may be provided.

DESCRIPTION OF DRAWINGS

FIG. 4 is a diagram for describing a method for determining a preference using a captured image according to one embodiment.

In the description of the drawings, the same or similar reference numerals may be used for the same or similar components.

MODE FOR INVENTION

Figure 1:
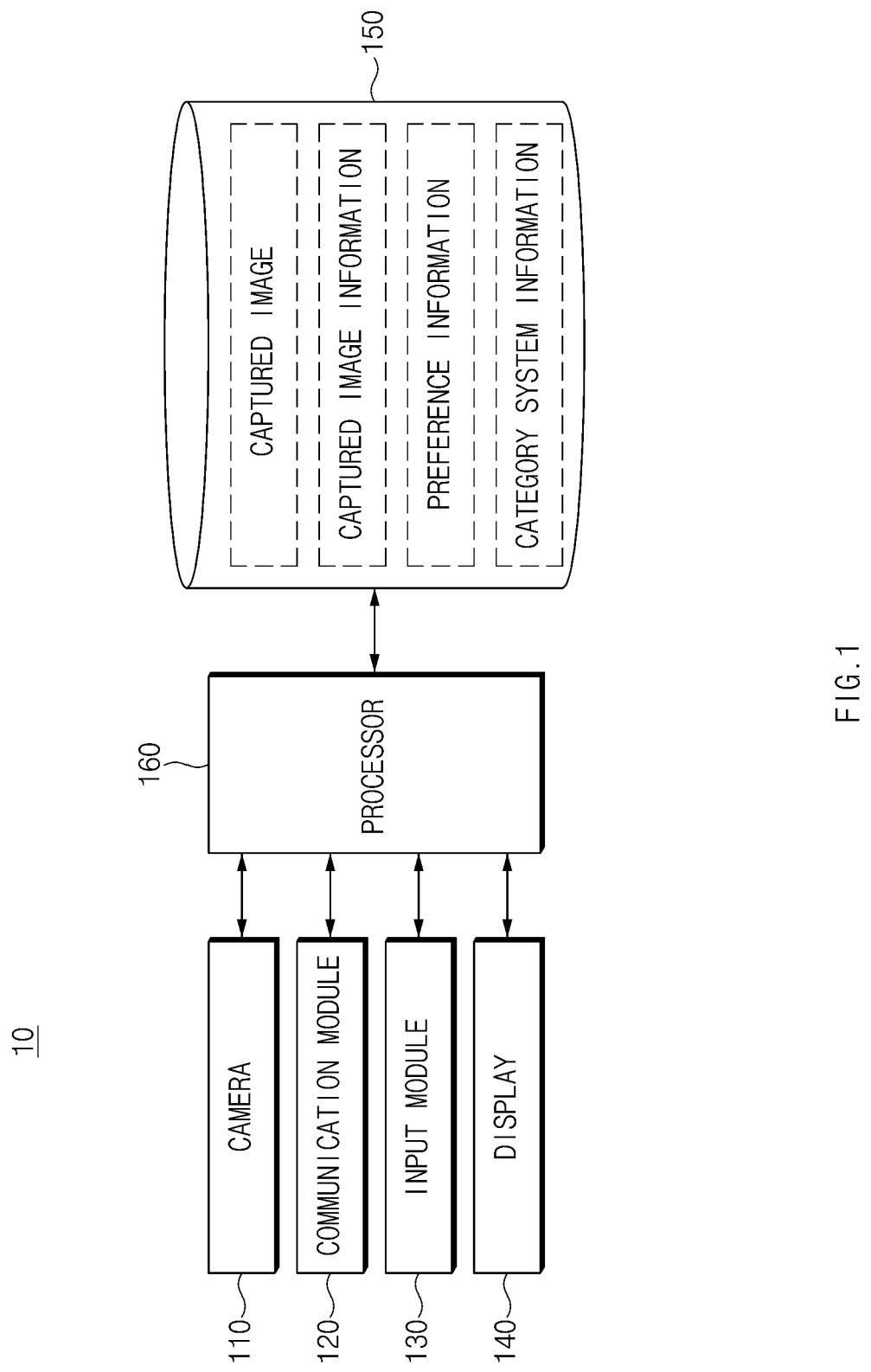
FIG. 1 illustrates a configuration of an electronic device according to one embodiment.

Hereinafter, various embodiments of the disclosure may be described with reference to accompanying drawings.

Accordingly, those of ordinary skill in the art will recognize that modification, equivalent, and/or alternative on the various embodiments described herein can be variously made without departing from the scope and spirit of the disclosure.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the various embodiments may be used to refer to various components regardless of the order, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

FIG. 1 illustrates a configuration of an electronic device according to one embodiment.

Referring to FIG. 1, according to an embodiment, an electronic device 10 may include a camera 110, a communication module 120, an input module 130, a display 140, a memory 150, and a processor 160. In one embodiment, some components may be omitted or additional components may be further included. In one embodiment, some of the components may be coupled to each other to become a single entity and may perform functions of the corresponding components before the coupling in the same manner. In one embodiment, the electronic device 10 may be composed of a plurality of devices. For example, the electronic device 10 may include a mobile terminal and a server. Input/output relationships illustrated in FIG. 1 are only an example for convenience of description. The disclosure may not be limited thereto.

According to an embodiment, the camera 110 may create a live view image or a captured image. The captured image may include, for example, at least one of a moving image and a still image. The camera 110 may include at least one of one or more lenses, an image sensor, an image signal processor, and a flash.

According to an embodiment, the communication module 120 may form a communication channel for communication of at least one communication manner. The communication module 120 may include, for example, a communication circuit for at least one of 3G (CDMA and GSM) communication, long term evolution (LTE) communication, and WiFi. The communication module 120 may include a communication circuit for GPS reception, as another example. For example, the communication module 120 may convert a signal of a specified communication manner received through a specified communication channel into a format interpretable by the processor 160. The communication module 120 may convert a signal received from the processor 160 into the signal of the specified communication manner and transmit the converted signal to the specified communication channel.

According to an embodiment, the input module 130 may sense or receive a user input. For example, the input module 130 may be a touch sensor disposed on a touch screen (e.g., the display 140).

The display 140 may include, for example, a liquid crystal display (LCD), a light emitting diode (LED) display, an organic light emitting diode (OLED) display, or an electronic paper display. The display 140 may, for example, display various contents (e.g., a text, an image, a video, an icon, and/or a symbol, and the like) to the user. According to an embodiment, the display 140 may output (or display)

at least one of the live view image, the captured image, or additional information of an AR service based on instruction of the processor 160.

The memory 150 may be a volatile memory (e.g., a RAM, and the like), a non-volatile memory (e.g., a ROM, a flash memory, and the like), or a combination thereof. The memory 150 may, for example, store a command or data associated with one or more other components of the electronic device 10. According to an embodiment, the memory 150 may store at least one of a plurality of captured images, captured image information, category system information, and preference information.

According to an embodiment, the plurality of captured images may include at least one of photo image created using the camera 110, an image shared through an app (hereinafter, referred to as a 'shared image'), and a screen image obtained using a screen capture function. The shared image may include, for example, at least one of an image with a shared history among the captured images and a downloaded image. The screen capture function may include, for example, a screen shot function. The disclosure describes an example in which the memory 150 stores the plurality of captured images.

According to an embodiment, the captured image information may include at least one of category information of the captured image, history information of the captured image, and environment information of the captured image. The captured image information may be, for example, metadata information of the captured image.

The category information of the captured image may include, for example, information about a category (e.g., a parent category name, a sub-category name, and the like) to which at least one object included in the captured image belongs.

The history information of the captured image may include, for example, at least one of search history information of the captured image, shared history information of the captured image, tag information tagged to the captured image, and app information corresponding to the captured image. The search history information may include, for example, at least one of text search history information and voice search (e.g., a bixby vision search function) history information. The shared history information may include, for example, upload history information or download history information of the captured image through an app through which each captured image may be shared (e.g., a text message app, a social network app, a chat app, and the like). The tag information may include, for example, at least one of voice information and text information tagged in each captured image.

The environment information of the captured image may include, for example, at least one of creation date information, creation time information, creation location information, and weather information at a time of creation of the captured image.

According to an embodiment, the category system information may include, for example, information for determining a category to which a recognized object belongs among a plurality of categories. The category system information may include information about a system of a plurality of parent categories corresponding to kinds (or types) of the recognized object and a plurality of sub-categories included in each parent category.

According to an embodiment, the preference information may be information indicating at least one of a preference score and a preference rank of the user for the plurality of categories. For example, the preference information may include a preference rank of the user for at least one of parent categories or sub-categories corresponding to the plurality of captured images.

The processor 160 may include, for example, at least one of a central processing unit (CPU), a graphics processing unit (GPU), a microprocessor, an application processor, an application specific integrated circuit (ASIC), and a field programmable gate array (FPGA), and may include a plurality of cores. The processor 160 may perform calculation or data processing associated with control and/or communication of one or more other component of the electronic device 10.

According to an embodiment, when an augmented reality service (hereinafter, referred to as an 'AR service') is requested, the processor 160 may obtain the live view image using the camera 110, determine at least one image having a relatively high preference among the plurality of captured images as additional information of the AR service based on at least one of the preference information and the object included in the live view image, and display the additional information and the live view image on the display 140.

According to an embodiment, for providing the AR service, the processor 160 may obtain each captured image stored in the memory 150, determine a category corresponding to the object included in each captured image, and store each captured image and category information corresponding to each captured image in a manner of associating each captured image with the category information. For example, when an app for the AR service is installed, the processor 160 may recognize the object included in each of the plurality of captured images stored in the memory 150 before providing the AR service using the app, and determine a category to which the recognized object belongs. In another example, when a new captured image is identified, the processor 160 may recognize an object included in the new captured image, determine a category to which the recognized object belongs, and store the new captured image and determined category information in a manner of associating the new captured image with the determined category information.

The processor 160 may determine preference information for each category using the category information of each captured image. For example, the processor 160 may identify at least one category (one or more categories) corresponding to the object included in each captured image using the category information of each captured image. The processor 160 may identify a frequency of appearances of at least one category, and determine the preference information (or a preference priority) for each category based on the frequency of appearances of the at least one category.

The processor 160 may determine priority of each category by applying at least one weight value on the categories based on the captured image information. For example, the processor 160 may apply, compared to other images, a relatively high weight value to a frequency of appearances (or a ratio) of an image with search history, the image with the shared history, the image obtained using the screen capture function, or the image with the tag information among the plurality of captured images from the captured image information, and determine preferences of the categories corresponding to the plurality of captured images using the frequency of appearances to which the weight value is applied. In another example, the processor 160 may analyze a pattern of environment information corresponding to a time of creation of the captured image belonging to a category from the captured image information, and apply the relatively high weight value to the category from which the pattern of the environment information is extracted.

According to an embodiment, when an AR VIEW function for the AR service is requested, the processor 160 may obtain the live view image using the camera 100 and recognize the object included in the live view image. For example, the processor 160 may extract feature information of the live view image, compare the feature information of the live view image with feature information of the object for each category stored in the memory 150, and determine the object included in the live view image and a category to which the object belongs based on feature information of the object for each category that matches the feature information of the live view image as a result of the comparison. The processor 160 may, for example, determine an object corresponding to the feature information matched with the feature information of the live view image among the feature information of the object for each category as the object included in the live view image. The processor 160 may determine, for example, a category to which the determined object belongs as the category to which the object included in the live view image belongs. For another example, the processor 160 may recognize the object included in the live view image and a first category to which the object belongs, which are determined by transmitting the live view image to a specified server (e.g., a big data server) and comparing, by the specified server, the feature information of the live view image with feature information of the object stored in a database of the specified server. In a following document, as in the former, the case in which the processor 160 determines the first category based on the feature information of the live view image will be described as an example.

According to an embodiment, the processor 160 may obtain at least one captured image corresponding to the first category to which the object included in the live view image belongs among the plurality of captured images stored in the memory 150, for example, stored in a photo album folder based on the category information, and determine at least one image belonging to a category with a relatively high preference among the at least one captured image obtained based on the preference information as the additional information of the AR service.

The processor 160 may identify category information of the at least one captured image stored in the photo album folder, and identify at least one second category excluding the first category among categories corresponding to the at least one captured image. The processor 160 may determine at least one image belonging to a category with a relatively high preference among the at least one second category as the additional information of the AR service based on the preference information.

According to an embodiment, when the at least one captured image belonging to the first category includes a plurality of images and preferences of the plurality of images are the same, the processor 160 may determine the additional information of the AR service using captured image information or pixel values of the plurality of images.

According to an embodiment, the processor 160 may identify environment information at a time of capturing at which each of the plurality of images is created and environment information at a current time at which the live view image is obtained, and determine at least one image among the plurality of images based on a relative similarity between the environment information at the time of capturing of the plurality of images and the environment information at the current time.

For example, when preference information of the plurality of images are the same, the processor 160 may identify current date information and the creation time information of the plurality of images, respectively, and when there is an image captured on a date the same as or similar to a current date among the plurality of images, determine the corresponding image as the additional information of the AR service. The current date information may be identified, for example, from information (e.g., standard time information) received through the communication module 120 or date information calculated by the processor 160. The creation time information of each image may be identified, for example, from metadata of each image. The similar date may be a date for a specified period (e.g., one week) before or after the current date.

In another example, when the preference information of the plurality of images are the same, the processor 160 may identify current location information of the electronic device 10 and capturing location information of the plurality of images, respectively. When there is an image captured at a close location within a specified distance (e.g., 100 m) from a current location of the electronic device 10 among the plurality of images, the processor 160 may determine the corresponding image as the additional information of the AR service. The current location information of the electronic device 10 may be identified, for example, using information (e.g., GPS information) received through the communication module 120. The capturing location information of each image may be identified, for example, from the metadata of each image. The specified distance may be, for example, a distance less than a distance (or a depth) between the recognized object and the electronic device 10. In another example, the specified distance may be determined experimentally as an available distance within 20 minutes on foot.

In another example, when the preference information of the plurality of images are the same, the processor 160 may respectively identify current date and time information and capturing date and time information of the plurality of images, and determine at least one image that is relatively recently captured among the plurality of images as the additional information of the AR service. The current date and time information may be identified, for example, from the information (e.g., the standard time information) received through the communication module 120 or date and time information calculated by the processor 160. Stored date and time information of each image may be identified, for example, from the metadata of each image.

According to an embodiment, when the preference information of the plurality of images are the same, the processor 160 may determine at least one image with the shared history, the search history, or tagging history, or created with the screen capture function among the plurality of images as the additional information of the AR service.

According to an embodiment, when the preference information of the plurality of images are the same, the processor 160 may determine the additional information of the AR service based on a tone similarity between the live view image and each image. For example, the processor 160 may identify an average of pixel values of the live view image and an average of pixel values of each image, and determine at least one image with the average of the pixel values greatly similar to the average of the pixel values of the live view image among the plurality of images as the additional information of the AR service.

According to an embodiment, when the preference information of the plurality of images are the same, the processor 160 may determine the additional information of the AR service among the plurality of images based on the user input. For example, when a specified function (e.g., a manual filtering function) is selected through the input module 130, the processor 160 may display a list of parent categories corresponding to the plurality of images based on the category system information and category information of the plurality of images. Further, when at least one category of the parent category list is selected through the input module 130, the processor 160 may display a list of sub-categories of the selected category. When one sub-category in the list of sub-categories displayed through the input module 130 is selected, the processor 160 may determine at least one image belonging to the selected sub-category among the plurality of images as the additional information of the AR service.

According to an embodiment, the processor 160 may identify object information corresponding to the object recognized based on the user's taste (e.g., personal information), determine the identified object information as the additional information of the AR service, and display the determined additional information of the AR service on the display 140 together with the live view image. The processor 160 may, for example, identify the user's taste using at least one of preference information or personal information for a category. For example, the processor 160 may transmit the live view image and user's taste information to the specified server (e.g., a shopping mall server), and receive the object information determined, by the specified server, to correspond to the object included in the live view image based on the user's taste information from the specified server. In another example, the processor 160 may determine object information based on the user's taste from the object information corresponding to the object included in the live image from the memory 150. In the disclosure, the case in which the processor 160 determines the object information based on the user's taste using the object information stored in the memory 150 will be described as an example.

According to an embodiment, when not identifying the user's taste, the processor 160 may display object information corresponding to a default taste, for example, price information of the object among the object information corresponding to the recognized object together with the live view image.

According to an embodiment, when identifying a taste of a user who is interested in food (or cooking), the processor 160 may display, among the object information corresponding to the recognized object, object information corresponding to the cooking, for example, information related to a recipe using the recognized object together with the live view image.

According to an embodiment, when identifying a taste of a user who is interested in health or diet, the processor 160 may display, among the object information corresponding to the recognized object, object information corresponding to the health or the diet, for example, calorie or constituent information of the recognized object together with the live view image.

According to an embodiment, the processor 160 may obtain promotion information based on the user's taste or the preference corresponding to the category, and display the obtained promotion information (the additional information of the AR service) and the live view image on the display 140. For example, the processor 160 may identify the current location information of the electronic device 10, and determine promotion information within the specified distance from the current location information as the additional information of the AR service. In another example, the processor 160 may transmit the user's taste or the preference information to the specified server (e.g., an advertisement service server) through the communication module 120, receive the promotion information corresponding to the user's taste or the preference information, and display the received promotion information together with the live view image.

According to an embodiment, the electronic device (e.g., the electronic device 10 in FIG. 1) may include a camera (e.g., the camera 110 in FIG. 1), a display (e.g., the display 140 in FIG. 1), a memory (e.g., the memory 150 in FIG. 1) storing a plurality of captured images and preference information for each captured image, and a processor (e.g., 160 in FIG. 1) operatively connected to the camera, the display, and the memory. The processor may obtain a live view image using the camera, determine at least one image of which a preference is relatively high among the plurality of captured images as additional information of an augmented reality service based on at least one of the preference information and an object included in the live view image, and display the additional information and the live view image on the display.

According to an embodiment, the memory may store each captured image and category information corresponding to an object included in each captured image in a manner of associating each captured image with the category information. Further, the preference information may be preference information for the category information. The processor may obtain at least one captured image corresponding to a category to which the object included in the live view image belongs among the plurality of captured images based on the category information, and determine at least one image belonging to the category with the relatively high preference among the obtained at least one captured image based on the preference information.

According to an embodiment, the electronic device may further include a communication module set to communicate with a server. The processor may transmit the live view image to the server through the communication module, and receive category information about a category to which the object included in the live view image belongs from the server.

The category information about the category of the object included in the live view image may be determined based on a result of comparison, by the server, between the object included in the live view image and an object stored in a database of the server.

The processor may identify category information about categories to which objects included in the plurality of captured images belong, and determine preference information for the category information about the categories to which the objects included in the plurality of captured images belong using a frequency of appearances of the category information about the categories to which the objects included in the plurality of captured images belong.

The processor may be determine the preference information for the category information about the categories to which the objects included in the plurality of captured images belong by applying the weight value on a frequency of appearances of at least one category based on at least one of history information about creation, sharing, or editing of each captured image, and environment information corresponding to a time of creation of each captured image.

The history information may include at least one of search history information of each captured image, shared history information of each captured image, tag information of each captured image, and app information about an app created each captured image.

The environment information may include at least one of time information, date information, current location information, and weather information.

According to an embodiment, the processor may identify at least one second category excluding a first category to which the object included in the live view image belongs among categories to which an object included in the at least one captured image belongs based on category information of the at least one captured image, and determine the at least one image of which the preference is relatively high among the at least one second category as the additional information based on the preference information.

The processor may, when the at least one captured image includes a plurality of images, and preferences of the plurality of images are the same, identify environment information at a time of capturing each of the plurality of images and environment information at a current time of obtaining the live view image, respectively, and determine the at least one image among the plurality of images based on a relative similarity between the environment information at the time of capturing and the environment information at the current time.

The processor may, when there is an image captured at a close location within a specified distance from a current location of the electronic device among the plurality of images, determine at least one image at the close location within the specified distance as the additional information.

The processor may determine at least one image having a shared history, a search history, or a tagging history, or created using a screen capture function among the plurality of images as the additional information.

The processor may, when the at least one captured image includes a plurality of images, and preferences of the plurality of images are the same, identify current time information and current date information among capturing date and capturing time information and the environment information of the plurality of images, and determine at least one image relatively recently captured among the plurality of images as the additional information.

The processor may, when the at least one captured image includes a plurality of images, and preferences of the plurality of images are the same, identify tones of the live view image and the plurality of images, and determine at least one image relatively similar in tone to the live view image among the plurality of images.

The memory may further store a plurality of promotion information, and the processor may identify association between environment information of the plurality of captured images and category information of the plurality of captured images, identify a user's taste corresponding to the environment information and the category information based on the identified association, determine promotion information corresponding to the user's taste among the plurality of promotion information based on environment information at a current time of obtaining the live view image, and display the live view image and the promotion information on the display.

Figure 2:
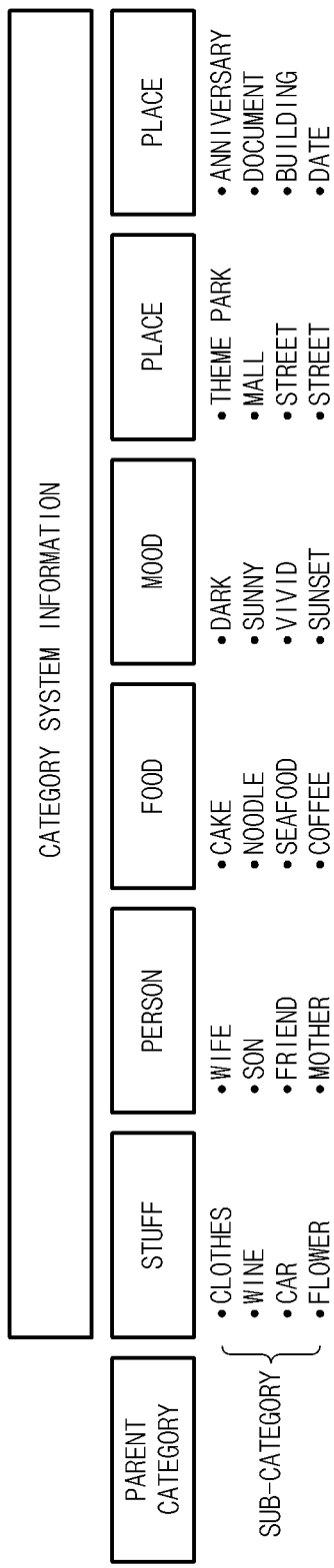
FIG. 2 illustrates a category system according to one embodiment.

FIG. 2 illustrates a category system according to one embodiment.

Referring to FIG. 2, according to an embodiment, the plurality of categories may include a plurality of parent categories, and each parent category may include a plurality of sub-categories. The plurality of parent categories may include, for example, a stuff category, a person category, a food category, a mood category, a place category, and an "other" category. Each category may be for classifying objects.

According to an embodiment, the stuff category, which is a category for classifying stuff objects, may include, for example, sub-categories such as clothes, wine, car, a flower, and the like.

According to an embodiment, the person category, which is a category for classifying person objects, may include, for example, sub-categories such as a wife, a son, a friend, a mother, and the like.

According to an embodiment, the food category, which is a category for classifying food objects, may include, for example, sub-categories such as cake, noodle, seafood, coffee, and the like.

According to an embodiment, the mood category, which is a category for classifying effects applied to the captured image, may include, for example, dark, sunny, vivid, sunset, and the like.

According to an embodiment, the place category, which is a category for classifying place objects, may include a theme park, a mall, a street, a landmark, a building, and the like.

According to an embodiment, the "other" category, which is a category that includes sub-categories that are not included in other parent categories, may include an anniversary, a document, a building, a date, and the like.

The plurality of categories may be registered or updated through the input module (e.g., 130 in FIG. 1) or processes of big data collection and the like. For example, when a captured image and a category name for a specific person (e.g., the wife, the son, the friend, the mom, and the like) of the person category are registered through the input module 130, the processor (e.g., 160 in FIG. 1) may register a specific person category as the sub-category for the person category. In another example, when a new object that is not able to be recognized is recognized from the feature information stored in the memory (e.g., 150 in FIG. 1), the processor 160 may request category definition for the new object through the display (e.g., 140 in FIG. 1). When the category for the new object is newly defined through the input module 130, the processor 160 may store feature information of the new object and newly defined category information in a manner of associating the feature information of the new object with the newly defined category information. Further, when recognizing the new object, the processor 160 may classify the new object using the new category.

Figure 3A:
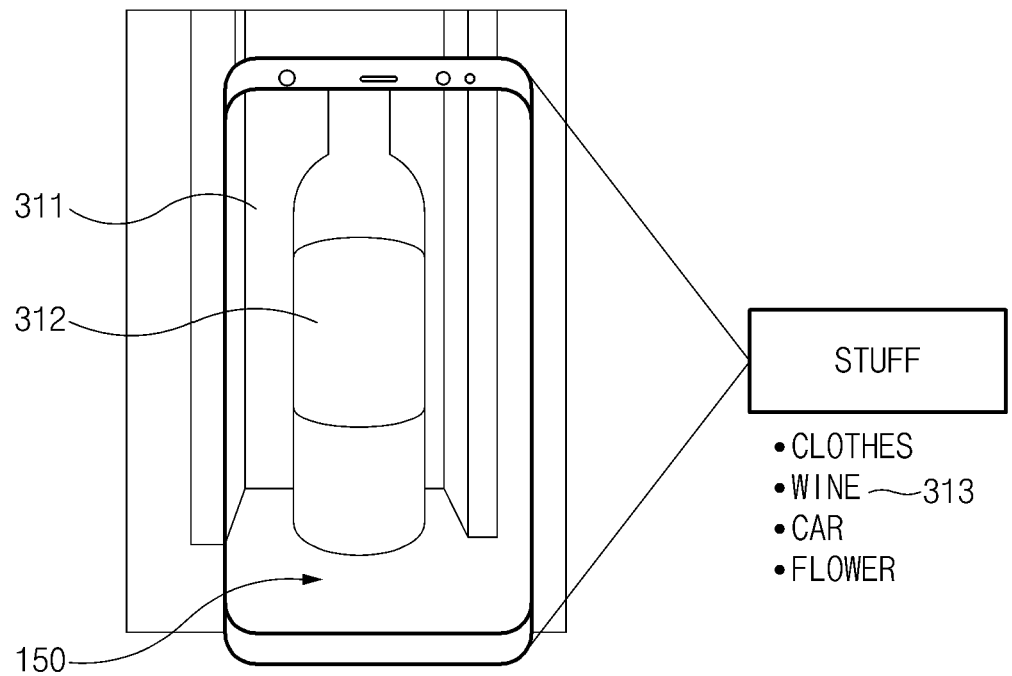
FIG. 3A illustrates a UI screen of an object recognition process according to one embodiment.
Figure 3B:
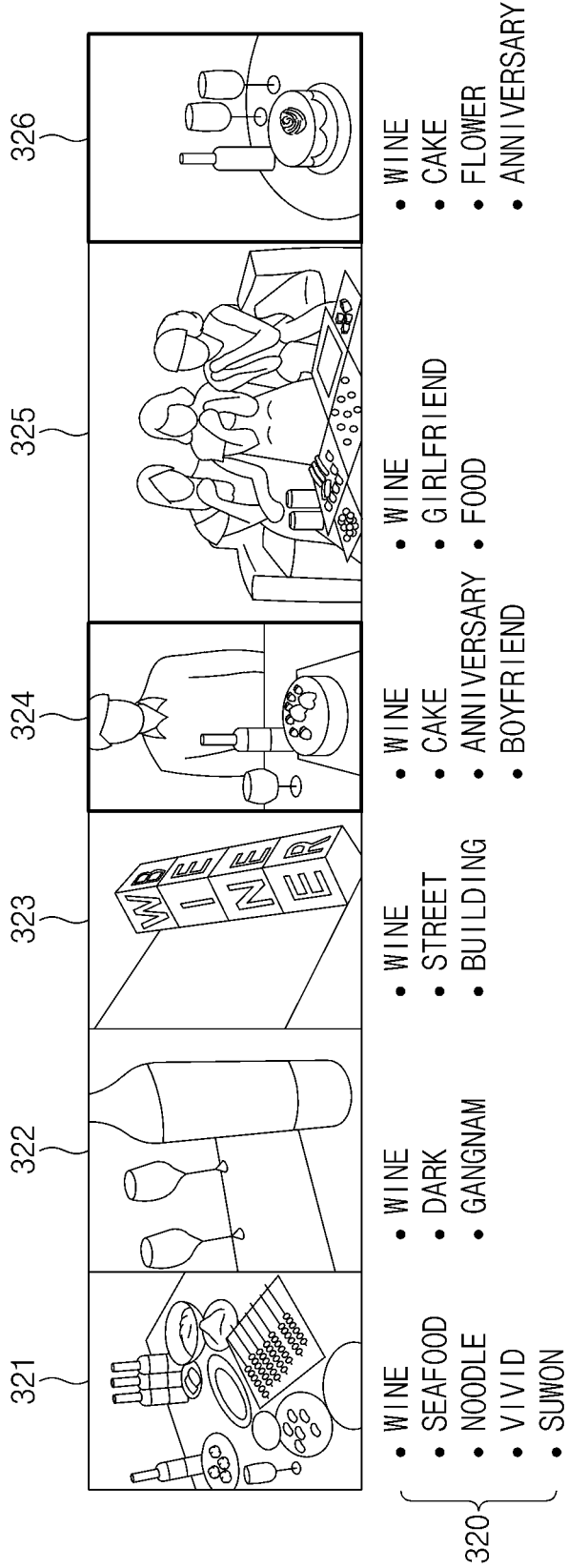
FIG. 3B is a diagram for describing a method for determining additional information of an AR service corresponding to a recognized object according to one embodiment.
Figure 3C:
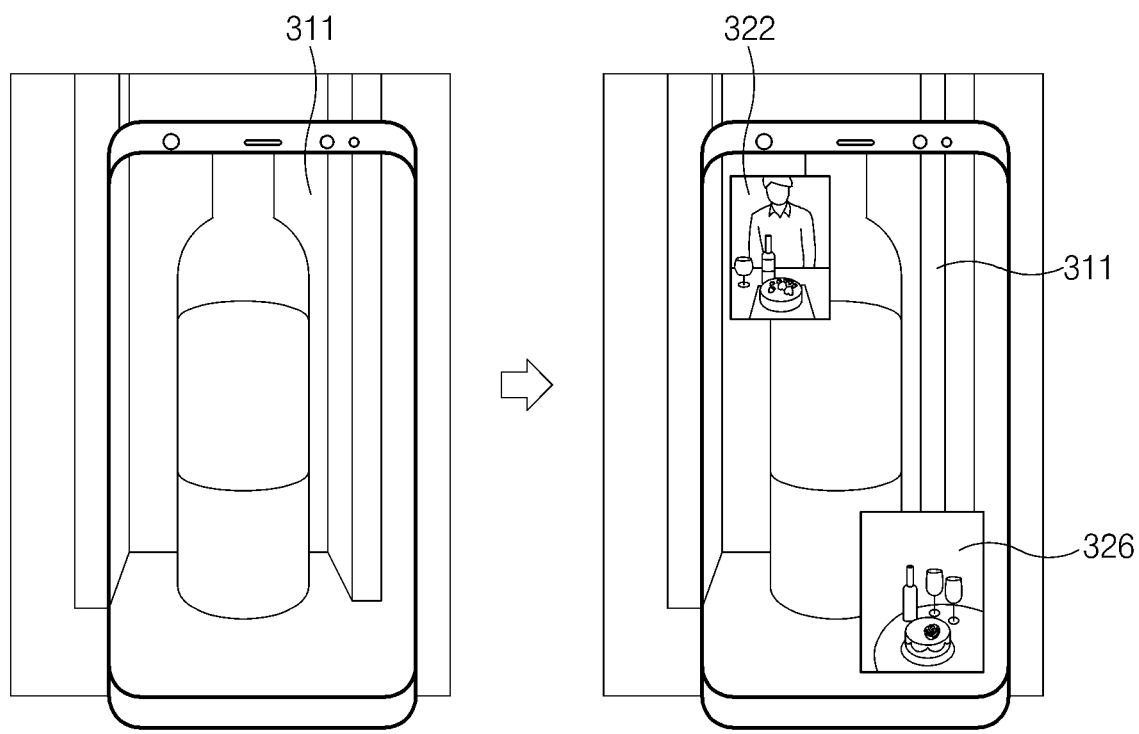
FIG. 3C illustrates a UI screen that displays additional information of an AR service determined from a captured image according to one embodiment.

FIGS. 3A to 3C are UI screens of processes in which the electronic device according to an embodiment provides the AR service.

FIG. 3A illustrates a UI screen of an object recognition process according to one embodiment.

Referring to FIG. 3A, according to an embodiment, when the AR service is requested, the processor (e.g., 160 in FIG. 1) may display a live view image 311 obtained using the camera (e.g., 110 in FIG. 1) on the display (e.g., 140 in FIG. 1). The processor 160 may extract feature information of a live view image 311, compare the extracted feature information with the feature information of the object for each category stored in the memory (e.g., 150 in FIG. 1), and determine a first category 313 to which an object 312 included in the live view image 311 belongs based on the comparison result. It may be identified that the object 312 included in the live view image 311 is wine belonging to the wine category 313 among the sub-categories of the stuff category (the parent category).

FIG. 3B is a diagram for describing a method for determining additional information of an AR service corresponding to a recognized object according to one embodiment.

Referring to FIG. 3B, according to an embodiment, the processor (e.g., 160 in FIG. 1) may search for and obtain all images belonging to the wine category among the plurality of captured images stored in the memory (e.g., 150 in FIG. 1). For example, the processor 160 may identify category information 320 of the plurality of captured images, and obtain first to sixth images 321, 322, 323, 324, 325, and 326 belonging to the wine category based on the category information 320.

According to an embodiment, the processor 160 may identify preference information of the user for at least one second category to which the first to sixth images 321, 322, 323, 324, 325, and 326 belong, and determine at least one image belonging to a category having a relatively high preference among the at least one second category as the additional information of the AR service based on the preference information. The at least one second category, which is a category excluding the wine category to which the recognized object belongs, may include, for example, seafood, noodle, vivid, Suwon, dark, Gangnam, street, building, cake, anniversary, boyfriend, girlfriend, food, flower categories like captured image information of the first to sixth images 321, 322, 323, 324, 325, and 326.

According to an embodiment, when preferences of the first image to the sixth image 326 identified based on the category information are the same, the processor 160 may determine the additional information of the AR service based on at least one of environment information and history information of the first to sixth images 321, 322, 323, 324, 325, and 326. For example, the processor 160 may determine the fourth image 324 shared through a social network on the same date of last year as the additional information of the AR service based on the environment information at the current time at which the live view image is obtained and the environment information of the first to sixth images 321, 322, 323, 324, 325, and 326. Additionally or alternatively, the processor 160 may determine the fourth image 324 having a history of being shared through the social network and the sixth image 326 created by the screen capture function as the additional information of the AR service based on the history information of the first to sixth images 321, 322, 323, 324, 325, and 326. In a following document, a case in which the processor 160 determines the fourth image 324 and the sixth image 326 as the additional information of the AR service based on the environment information and the history information will be described as an example.

FIG. 3C illustrates a UI screen that displays additional information of an AR service determined from a captured image according to one embodiment.

Referring to FIGS. 3A to 3C, according to an embodiment, when the first category to which the recognized object belongs is the wine category, the processor (e.g., 160 in FIG. 1) may overlap the fourth image 324 and the sixth image 326, which are included in the wine category and having relatively high preferences, with the live view image 311 as the additional information of the AR service, and display the overlapped image on the display (e.g., 140 in FIG. 1).

Figure 3D:
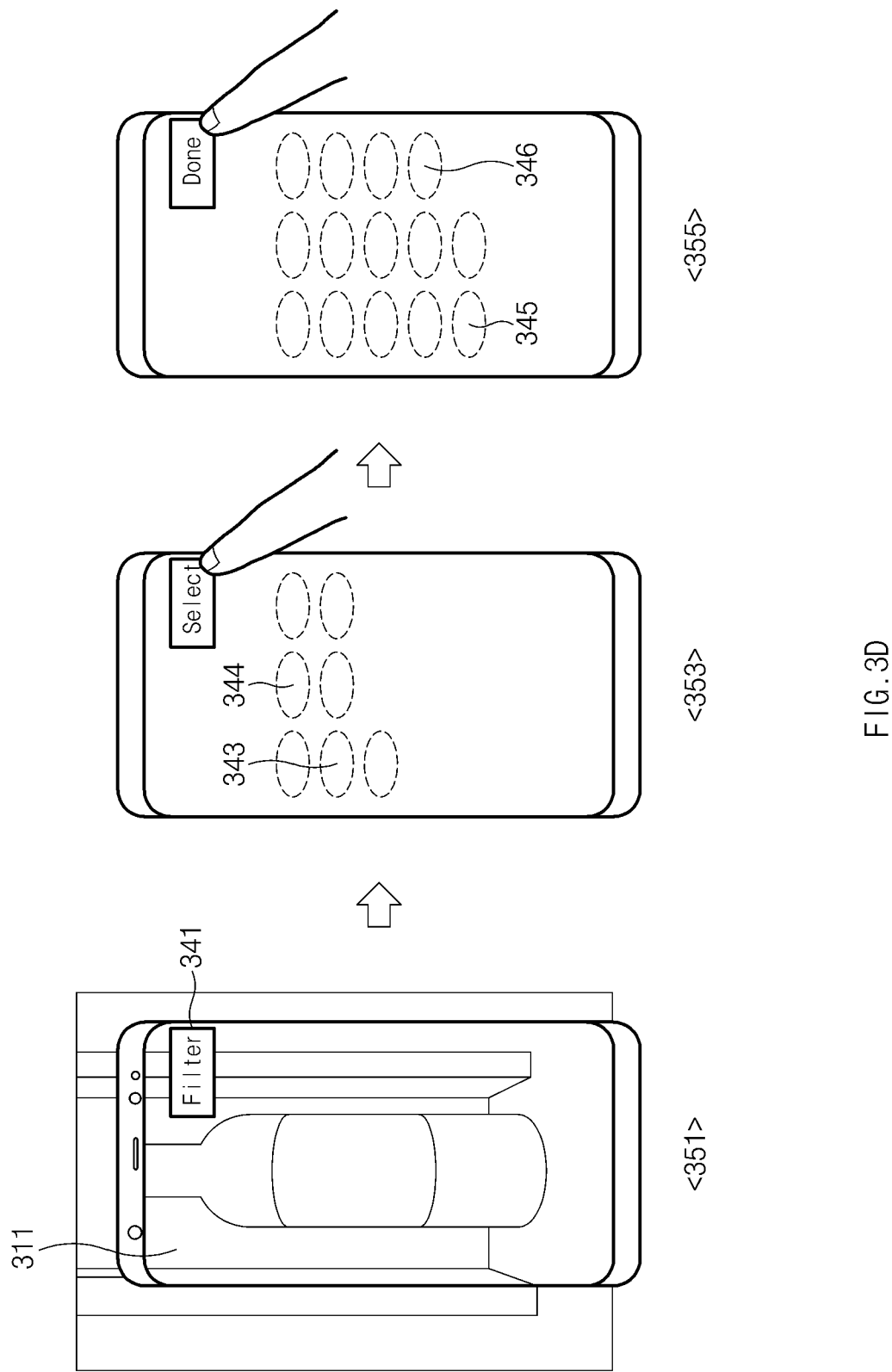
FIG. 3D illustrates a UI screen of a process of manually determining additional information of an AR service according to one embodiment.

FIG. 3D illustrates a UI screen of a process of manually determining additional information of an AR service according to one embodiment.

Referring to FIG. 3D, in an image <351>, the processor (e.g., 160 in FIG. 1) may display an icon 341 assigned to the manual filtering function in a situation in which the first category (the wine category) to which the object belongs is determined from the live view image 311, and the plurality of images belonging to the first category are obtained.

In an image <353>, when the icon 341 is selected, the processor 160 may display a list of parent categories of the at least one second category corresponding to the plurality of images to provide the manual filtering function.

When a plurality of parent categories are selected from the list of the parent categories through the input module (e.g., 130 of FIG. 1) in the image <353>, the processor 160 may display a list of sub-categories of the plurality of selected categories in an image <355>. For example, when a first parent category 343 and a second parent category 344 are touched and then a selection icon (Select) is touched, the processor 160 may display the list of the sub-categories of the selected first and second parent categories 343 and 344 as shown in the image <355>.

When one sub-category in the displayed list of the sub-categories is selected through the input module 130 in the image <353>, the processor 160 may determine at least one image belonging to the selected sub-category among the plurality of images as the additional information of the AR service. For example, when a first sub-category 345 and a second sub-category 346 are touched from the list of the sub-categories and then a completion icon (Done) is touched, the processor 160 may determine at least one image belonging to the selected sub-categories among the plurality of images as the additional information of the AR service.

Referring to FIG. 3B, a parent category to which the first to sixth images 321, 322, 323, 324, 325, and 326 belong may be the stuff category (e.g., the wine, the building, and the flower), the person category (e.g., the boyfriend and the girlfriend), the food category (e.g., the seafood, the noodle, and the cake), the mood category (e.g., the vivid and the dark), the place category (the Suwon, the Gangnam, and the street), and the "other" category (e.g., the anniversary). In this case, the processor 160 may display a list of the categories corresponding to the first to sixth images 321, 322, 323, 324, 325, and 326, for example, the stuff category, the person category, the food category, the mood category, the place category, and the "other" category. When the stuff category and the "other" category are selected through the input module 130, the processor 160 may display a list of second categories (e.g., the flower, the building, and the anniversary) excluding the wine category to which the recognized object belongs among sub-categories belonging to the stuff category and the "other" category. When the anniversary category is selected through the input module 130, the processor 160 may determine the fourth image 324 and the sixth image 326 as the additional information of the AR service.

FIG. 4 is a diagram for describing a method for determining a preference using a captured image according to one embodiment.

Referring to FIG. 4, according to an embodiment, a plurality of captured images stored in the memory (e.g., 150 in FIG. 1), for example, in the photo album folder may be respectively stored in association with category information respectively corresponding to the plurality of captured images. In this case, the processor (e.g., 160 in FIG. 1) may identify categories (sub-categories) respectively corresponding to the plurality of captured images based on the category information, identify respective frequencies of appearances of the identified sub-categories, and identify a ratio of the frequencies of appearances of the identified total sub-categories. For example, in an image <410>, as a result of analyzing the sub-categories to which the plurality of captured images respectively belong, the processor 160 may determine that a ratio (hereinafter, referred to as a 'first ratio') between a person A category (a user A), a person B category (a user B), a doll category, a coffee category, and the 'other' category is 0.3:0.2:0.2:0.15:0.15.

The processor 160 may apply a weight value to an image with the history information (e.g., the search history and the shared history) or the tag information, or an image obtained using the screen capture function among the plurality of captured images.

According to an embodiment, images with the shared history among the plurality of captured images and category information of the images with the shared history may be identified, and a ratio (hereinafter, referred to as a 'second ratio') of the images with the shared history to an entirety of the plurality of captured images may be identified for each category. For example, in an image <420>, when it is identified that a ratio of images having the shared history and corresponding to the doll category to the entirety of the plurality of captured images is 0.05, the processor 160 may determine the second ratio by multiplying the ratio (0.05) of the doll category by a specified weight value (e.g., 10).

According to an embodiment, images created using the screen capture function among the plurality of captured images and category information of the corresponding images may be identified, and a ratio of the images created using the screen capture function to the entirety of the plurality of captured images may be identified for each category. For example, in an image <430>, when it is identified that a ratio of images created using the screen capture function and corresponding to the doll category to the entirety of the plurality of captured images is 0.01, the processor 160 may determine a third ratio by multiplying the ratio (0.01) of the doll category by a specified weight value.

According to an embodiment, the processor 160 may determine a preference for each category using the first ratio determined based on an analysis result of the photo album folder, the second ratio determined based on the history information, and the third ratio determined based on the app information. For example, when the first ratio, the second ratio, and the third ratio for the doll category are respectively 0.2, 0.5, and 0.2, a preference for the doll category may be determined to be 0.9.

According to an embodiment, when there are no images with the history information and images created using the screen capture function among images corresponding to the person A category and the person B category, a preference of the person A category may be 0.3 and a preference of the person B category may be 0.2. In this case, the preference for the doll category may be the highest, the preference for the person A category may be the second highest, and the preference for the person B may be the third highest.

Figure 5:
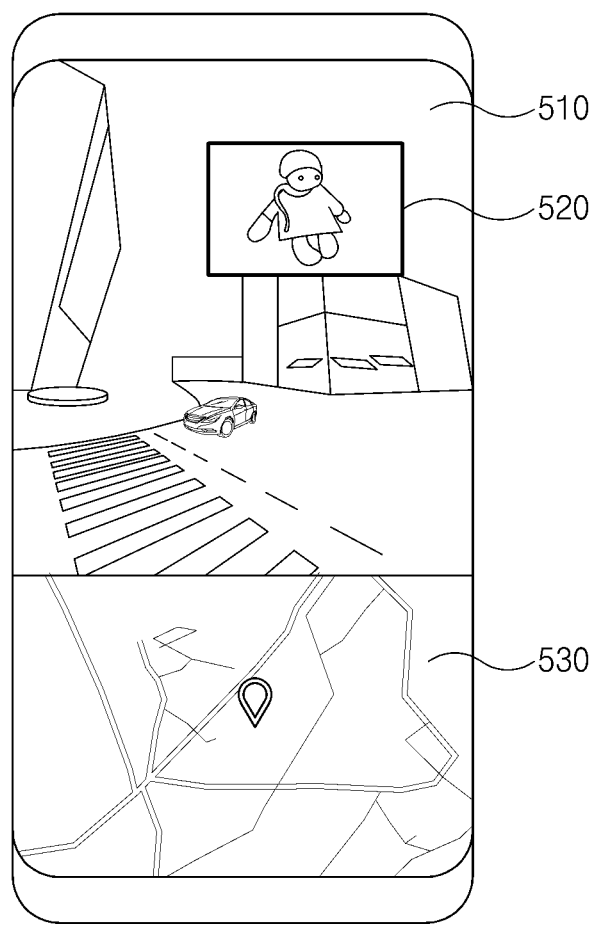
FIG. 5 illustrates a UI screen that provides additional information of an AR service corresponding to a place category according to one embodiment.

FIG. 5 illustrates a UI screen that provides additional information of an AR service corresponding to a place category according to one embodiment.

Referring to FIG. 5, according to an embodiment, when the first category to which an object recognized from a live view image 510 belongs is a place A (e.g., a specific distance) category, the processor (e.g., 160 in FIG. 1) may obtain a plurality of images belonging to the place A category. The plurality of images may belong to categories other than the place A category, so that the processor 160 may determine at least one image among the plurality of images belonging to a category with a relatively high preference among the categories other than the place A category as the additional information of the AR service based on preference information.

According to an embodiment, the categories other than the place A category may include a place B category (e.g., a specific store category) with a purchase history (the personal information) of a specified number of times or greater. In this case, the processor 160 may increase the preference determined based on the captured image based on the purchase history of the place B category. As a result, a preference of the place B category among the categories other than the place A category may be relatively high. The processor 160 may determine a captured image 520 created in the place B category having the highest preference among the categories other than the place A category as the additional information of the AR service. In an embodiment, the processor 160 may identify a distance between a place A and a place B, and determine the captured image created in the place B as the additional information of the AR service when the place A and the place B are within a specified distance (e.g., 100 m).

According to an embodiment, when displaying additional information of the AR service corresponding to a specific place close to the current location of the electronic device (e.g., 10 in FIG. 1), the processor 160 may display map information 530 including the current location and the specific place in addition to the live view image 510 and the additional information 520 of the AR service. For example, the processor 160 may display the map information 530 indicating the current location and the specific place.

Figure 6A:
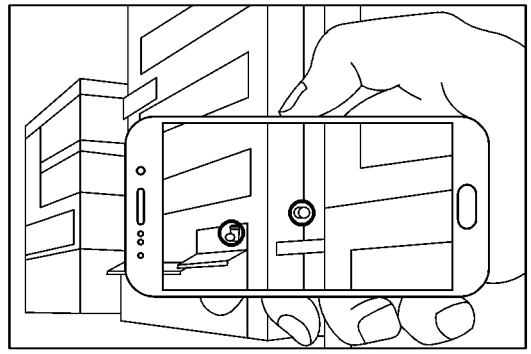
FIGS. 6A to 6C illustrate a UI screen that provides promotion information corresponding to a user's taste as additional information of an AR service according to one embodiment.
Figure 6B:
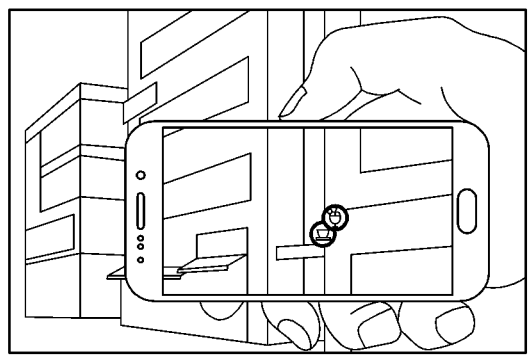
Figure 6C:
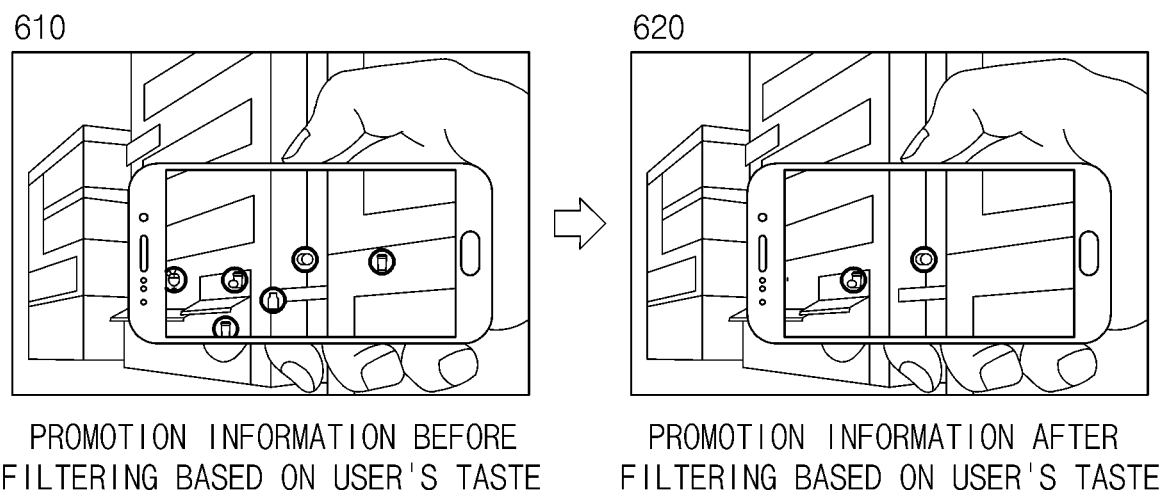

FIGS. 6A to 6C illustrate a UI screen that provides promotion information corresponding to a user's taste as additional information of an AR service according to one embodiment.

Referring to FIGS. 6A to 6C, according to an embodiment, the processor (e.g., 160 in FIG. 1) may identify association between environment information of a plurality of captured images and category information of the plurality of captured images, and identify a user's taste corresponding to the environment information and categories based on the identified association. The processor 160 may determine promotion information corresponding to the user's taste among a plurality of promotion information provided from the server based on environment information at a current time when a live view image is obtained, and display the live view image and the promotion information (the additional information of the AR service) on the display (e.g., 140 in FIG. 1).

Referring to FIG. 6A, according to an embodiment, as a result of analyzing the association between the environment information and the category information for the plurality of captured images, the processor 160 may identify that many captured images of brunch were created in the late morning on the weekend, and identify a taste of a user who likes to have brunch in the late morning on the weekend. In this case, when the AR service is executed in the late morning on the weekend, the processor 160 may identify promotion information corresponding to the current location of the electronic device (e.g., 10 in FIG. 1) stored in the memory (e.g., 150 in FIG. 1) (or the database of the specified server), and determine promotion information of a restaurant providing a brunch menu as the additional information of the AR service among the promotion information. The promotion information corresponding to the current location may include, for example, promotion information for a close place within a specified distance from the current location.

Referring to FIG. 6B, according to an embodiment, as a result of analyzing the association between the environment information and the category information for the plurality of captured images, the processor (e.g., 160 in FIG. 1) may identify that many captured images of coffee on a rainy Monday morning are created, and identify a taste of a user who likes to drink coffee on the rainy Monday morning. In this case, when the AR service is executed on the rainy Monday morning, the processor 160 may identify the promotion information corresponding to the current location of the electronic device (e.g., 10 in FIG. 1), and determine promotion information of a coffee shop among the promotion information stored in the memory (e.g., 150 in FIG. 1) (or the database of the specified server) as the additional information of the AR service.

Referring to FIG. 6C, as in an image <610>, when the user's taste is not identified or when a manual filtering function of the promotion information based on the user's taste is not set, the processor (e.g., 160 in FIG. 1) may overlap all promotion information at close locations within the specified distance from the current location of the electronic device (e.g., 10 in FIG. 1) with the live view image, and display the overlapped live view image.

As in an image <620>, when the user's taste is identified and when the manual filtering function of the promotion information based on the user's taste is set, the processor 160 may select promotion information based on the user's taste among the promotion information at the close locations within the specified distance from the current location of the electronic device 10, and output the selected promotion information as the additional information of the AR service.

In FIGS. 6A to 6C, according to an embodiment, the processor 160 may obtain promotion information corresponding to at least one environment information of the current location, current weather, or current time of the electronic device 10 using the promotion information stored in the memory 150. Additionally or alternatively, the processor 160 may communicate with a promotion server through the communication module (e.g., 120 in FIG. 1) to receive the promotion information corresponding to the environment information, and output the received promotion information as the additional information of the AR service.

Figure 7:
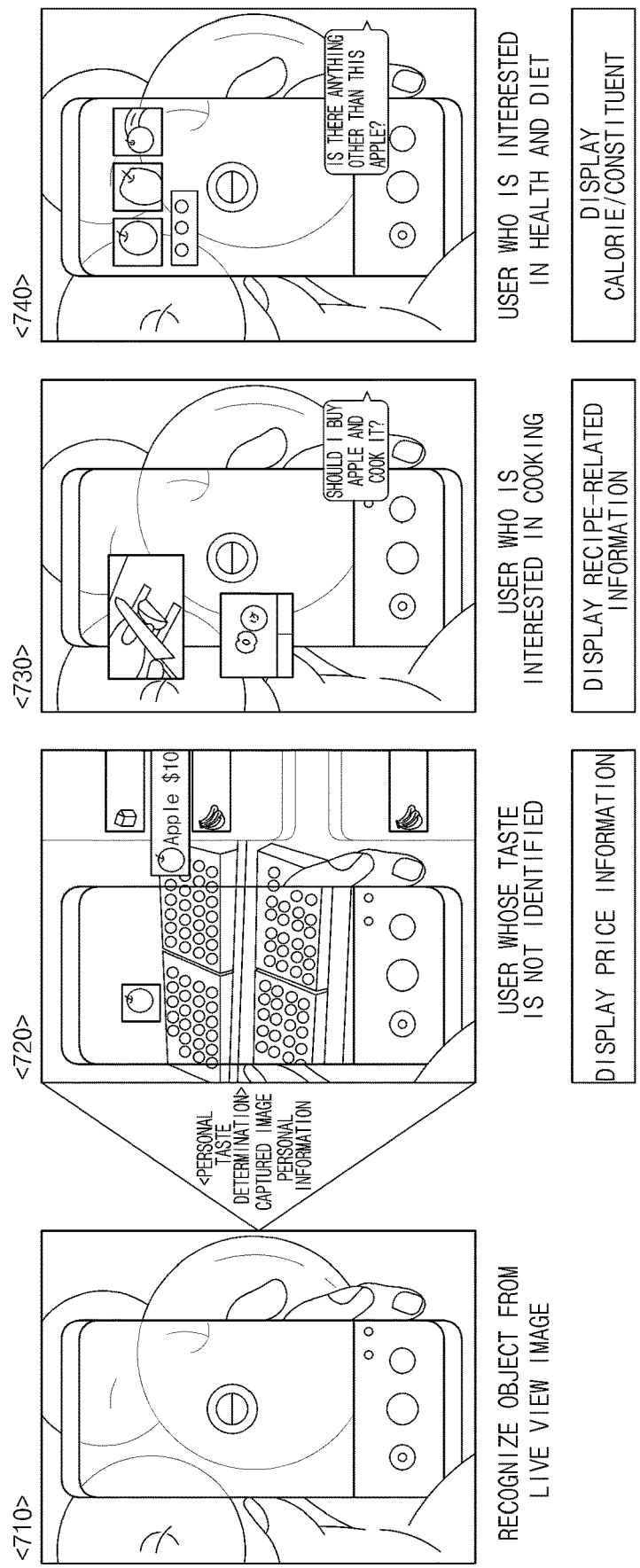
FIG. 7 illustrates a UI screen that provides additional information of an AR service according to a user's taste according to one embodiment.

FIG. 7 illustrates a UI screen that provides additional information of an AR service according to a user's taste according to one embodiment.

Referring to FIG. 7, according to an embodiment, the processor (e.g., 160 in FIG. 1) may determine object information based on a user's taste for an object recognized from a live view image as the additional information of the augmented reality service.

In an image <710>, the processor 160 may recognize an object (apple) from the live view image. For example, the processor 160 may analyze feature information of the live view image, compare the feature information of the live view image with the feature information stored in the memory (e.g., 150 in FIG. 1), identify that the object included in the live view image is the apple included in an apple category based on a category to which feature information stored in the memory 150 that matches the feature information of the live view image belongs as a result of the comparison.

In an image <720>, when user's taste information corresponding to the user's taste is not identified from the memory 150, the processor 160 may determine price information of the apple as the additional information of the AR service and display (e.g., overlay) the price information of the apple on the live view image.

In an image <730>, when a taste of a user who is interested in food (or cooking) is identified from the memory 150, the processor 160 may determine recipe-related information using the apple as the additional information of the AR service, and display the recipe-related information using the apple on the live view image.

In an image <740>, when a taste of a user who is interested in health or diet is identified, the processor 160 may determine calorie or constituent information of the apple as the additional information of the AR service, and display the calorie information or the constituent information of the apple on the live view image.

In the embodiment described above, the processor 160 may transmit, for example, the user's taste information to the specified server (e.g., the shopping mall server), receive the object information corresponding to the user's taste from the specified server, and display the received object information on the live view image.

Figure 8:
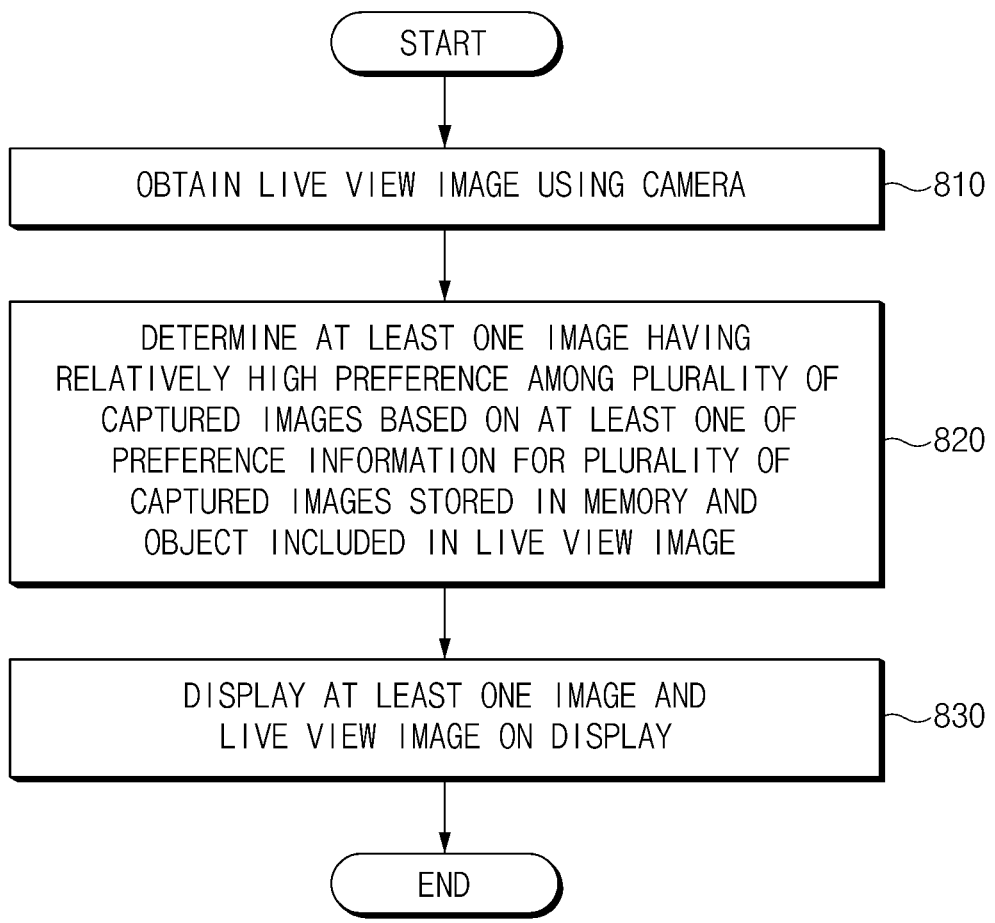
FIG. 8 is a flowchart illustrating a method for providing an augmented reality service according to one embodiment.

FIG. 8 is a flowchart illustrating a method for providing an augmented reality service according to one embodiment.

Referring to FIG. 8, in operation 810, the processor (e.g., 160 in FIG. 1) may obtain the live view image using the camera 110.

In operation 820, the processor 160 may determine the at least one image (the additional information of the AR service) having the relatively high preference among the plurality of captured images based on at least one of the preference information for the plurality of captured images stored in the memory (e.g., 150 in FIG. 1) and the object included in the live view image.

In operation 830, the processor 160 may display the at least one image and the live view image on the display (e.g., 140 in FIG. 1).

According to an embodiment, a method for providing an augmented reality service by an electronic device may include obtaining a live view image using a camera, determining at least one image having a relatively high preference among a plurality of captured images based on at least one of preference information for the plurality of captured images stored in a memory or an object included in the live view image, and displaying the at least one image and the live view image on a display.

Each captured image may be stored in association with category information corresponding to an object included in each captured image, and the preference information may be preference information for the category information. The determining of the at least one image having the relatively high preference may include obtaining at least one captured image corresponding to a category to which the object included in the live view image belongs among the plurality of captured images based on the category information, and determining the at least one image belonging to the category with the relatively high preference among the at least one captured image obtained based on the preference information.

The method for providing the augmented reality service may further include identifying category information corresponding to objects included in the plurality of captured images, and determining preference information for the category information using a frequency of appearances of the category information.

The determining of the at least one image as the additional information may include identifying at least one second category excluding a first category to which the object included in the live view image belongs among categories to which the object included in the at least one captured image belongs based on the category information of the at least one captured image, and determining at least one image with a relatively high preference among the at least one second category as the additional information based on the preference information.

The method for providing the augmented reality service may further include, when the at least one captured image includes a plurality of images and when preferences of the plurality of images are the same, identifying environment information at a time of creation of each of the plurality of images, and determining at least one image having a relatively high degree of similarity to environment information at a time of obtaining the live view image among the plurality of images as the additional information.

Figure 9:
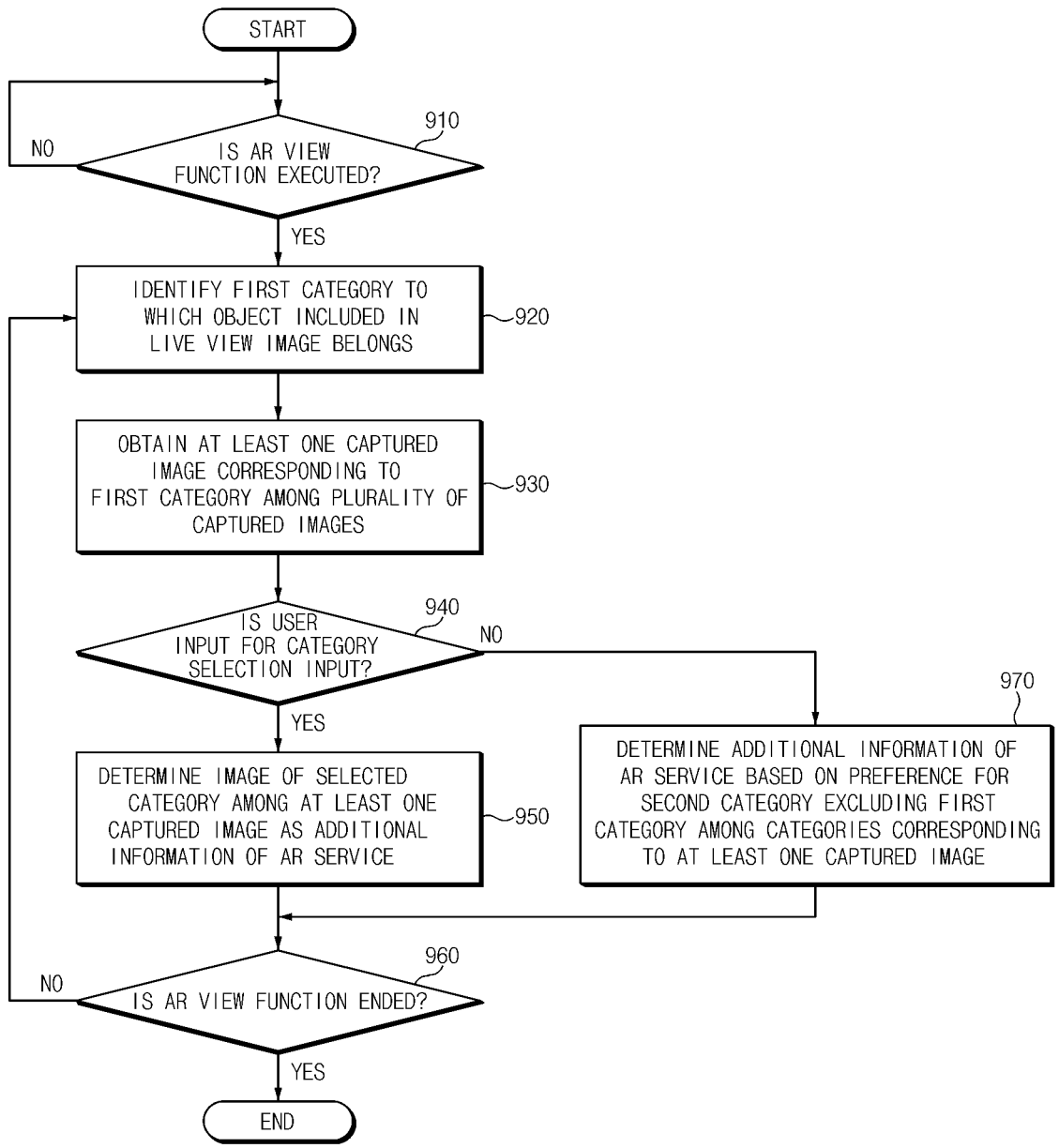
FIG. 9 is a flowchart illustrating a method for determining additional information of an AR service according to one embodiment.

FIG. 9 is a flowchart illustrating a method for determining additional information of an AR service according to one embodiment.

Referring to FIG. 9, when the AR view function is executed in the processor (e.g., 160 in FIG. 1) in operation 910, the first category to which the object included in the live view image belongs may be identified in operation 920.

In operation 930, the processor 160 may obtain the at least one captured image corresponding to (or associated with) the first category among the plurality of captured images stored in the memory (e.g., 150 in FIG. 1). For example, the processor 160 may identify the category information of the plurality of captured images, and obtain the at least one captured image corresponding to the first category from the category information.

In operation 940, the processor 160 may determine whether a user input for category selection is received or sensed through the input module (e.g., 130 in FIG. 1). For example, when the manual filtering function is selected through the input module 130, the processor 160 may provide a user interface selectable for at least one of the parent category or the sub-category except for the first category corresponding to the at least one captured image.

When the manual filtering function is selected in operation 940, the processor 160 may identify a user input to the user interface for the manual filtering and may determine at least one image corresponding to a category selected by the user input as the additional information of the AR service in operation 950.

When the manual filtering function is not selected in operation 940, the processor 160 may determine the additional information of the AR service based on the preference information for the at least one second category excluding the first category among the categories corresponding to the at least one captured image in operation 960. For example, the processor 160 may identify the preference information for the at least one second category, and determine the at least one image belonging to the category with the relatively high preference as the additional information of the AR service based on the preference information.

In FIG. 9, according to an embodiment, the processor 160 may perform at least one of operations 920 to 970 until the AR view function is ended.

Figure 10:
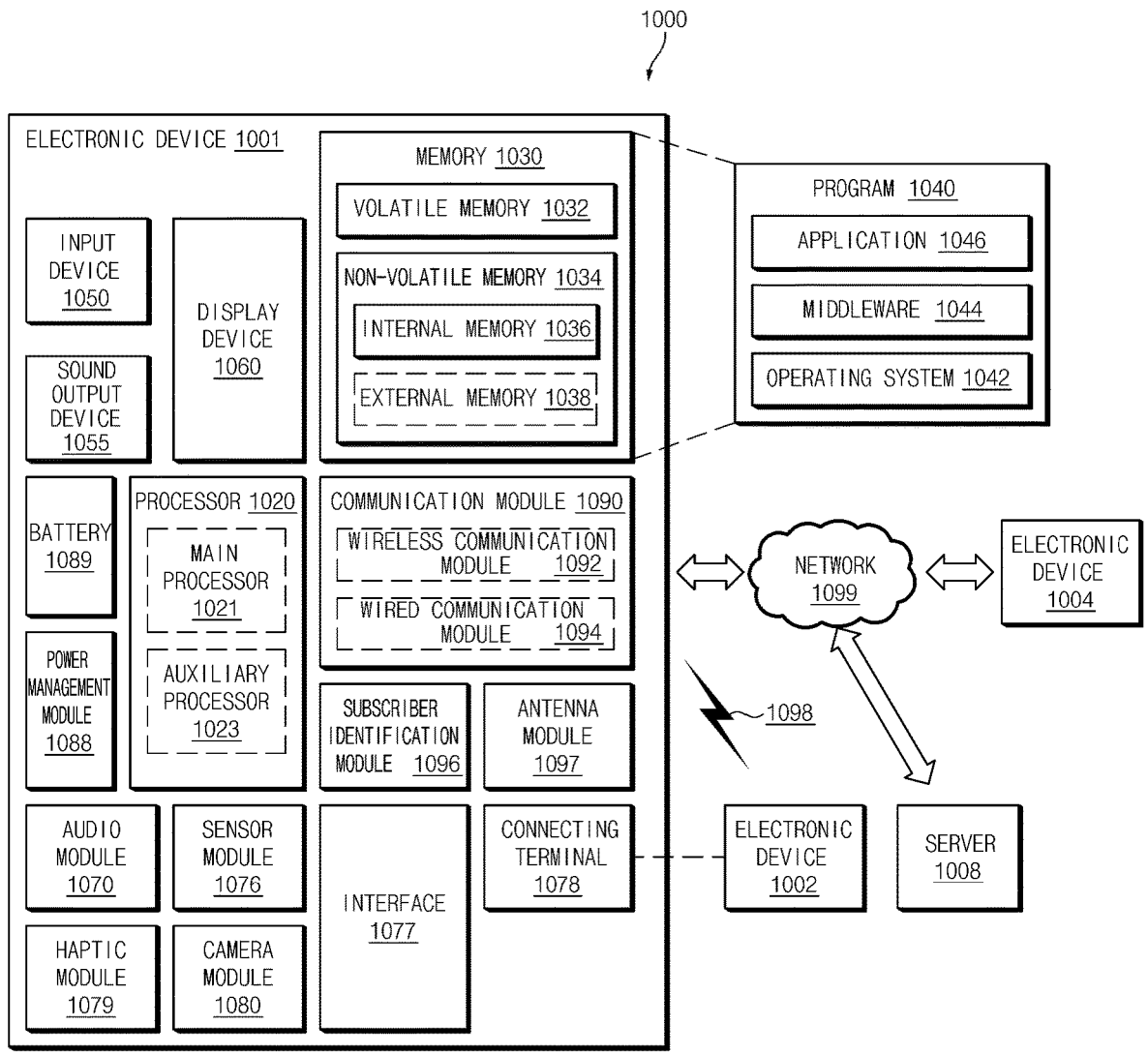
FIG. 10 illustrates a block diagram of an electronic device providing an augmented reality service in a network environment according to various embodiments.

FIG. 10 illustrates a block diagram of an electronic device 1001 providing an augmented reality service in a network environment 1000 according to various embodiments.

Referring to FIG. 10, an electronic device 1001 may communicate with an electronic device 1002 through a first network 1098 (e.g., a short-range wireless communication) or may communicate with an electronic device 1004 or a server 1008 through a second network 1099 (e.g., a long-distance wireless communication) in a network environment 1000. According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, and an antenna module 1097. According to some embodiments, at least one (e.g., the display device 1060 or the camera module 1080) among components of the electronic device 1001 may be omitted or other components may be added to the electronic device 1001. According to some embodiments, some components may be integrated and implemented as in the case of the sensor module 1076 (e.g., a fingerprint sensor, an iris sensor, or an illuminance sensor) embedded in the display device 1060 (e.g., a display).

The processor 1020 may operate, for example, software (e.g., a program 1040) to control at least one of other components (e.g., a hardware or software component) of the electronic device 1001 connected to the processor 1020 and may process and compute a variety of data. The processor 1020 may load a command set or data, which is received from other components (e.g., the sensor module 1076 or the communication module 1090), into a volatile memory 1032, may process the loaded command or data, and may store result data into a nonvolatile memory 1034. According to an embodiment, the processor 1020 may include a main processor 1021 (e.g., a central processing unit or an application processor) and an auxiliary processor 1023 (e.g., a graphic processing device, an image signal processor, a sensor hub processor, or a communication processor), which operates independently from the main processor 1021, additionally or alternatively uses less power than the main processor 1021, or is specified to a designated function. In this case, the auxiliary processor 1023 may operate separately from the main processor 1021 or embedded.

In this case, the auxiliary processor 1023 may control, for example, at least some of functions or states associated with at least one component (e.g., the display device 1060, the sensor module 1076, or the communication module 1090) among the components of the electronic device 1001 instead of the main processor 1021 while the main processor 1021 is in an inactive (e.g., sleep) state or together with the main processor 1021 while the main processor 1021 is in an active (e.g., an application execution) state. According to an embodiment, the auxiliary processor 1023 (e.g., the image signal processor or the communication processor) may be implemented as a part of another component (e.g., the camera module 1080 or the communication module 1090) that is functionally related to the auxiliary processor 1023. The memory 1030 may store a variety of data used by at least one component (e.g., the processor 1020 or the sensor module 1076) of the electronic device 1001, for example, software (e.g., the program 1040) and input data or output data with respect to commands associated with the software. The memory 1030 may include the volatile memory 1032 or the nonvolatile memory 1034.

The program 1040 may be stored in the memory 1030 as software and may include, for example, an operating system 1042, a middleware 1044, or an application 1046.

The input device 1050 may be a device for receiving a command or data, which is used for a component (e.g., the processor 1020) of the electronic device 1001, from an outside (e.g., a user) of the electronic device 1001 and may include, for example, a microphone, a mouse, or a keyboard.

The sound output device 1055 may be a device for outputting a sound signal to the outside of the electronic device 1001 and may include, for example, a speaker used for general purposes, such as multimedia play or recordings play, and a receiver used only for receiving calls. According to an embodiment, the receiver and the speaker may be either integrally or separately implemented.

The display device 1060 may be a device for visually presenting information to the user of the electronic device 1001 and may include, for example, a display, a hologram device, or a projector and a control circuit for controlling a corresponding device. According to an embodiment, the display device 1060 may include a touch circuitry or a pressure sensor for measuring an intensity of pressure on the touch.

The audio module 1070 may convert a sound and an electrical signal in dual directions. According to an embodiment, the audio module 1070 may obtain the sound through the input device 1050 or may output the sound through an external electronic device (e.g., the electronic device 1002 (e.g., a speaker or a headphone)) wired or wirelessly connected to the sound output device 1055 or the electronic device 1001.

The sensor module 1076 may generate an electrical signal or a data value corresponding to an operating state (e.g., power or temperature) inside or an environmental state outside the electronic device 1001. The sensor module 1076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support a designated protocol wired or wirelessly connected to the external electronic device (e.g., the electronic device 1002). According to an embodiment, the interface 1077 may include, for example, an HDMI (high-definition multimedia interface), a USB (universal serial bus) interface, an SD card interface, or an audio interface.

A connecting terminal 1078 may include a connector that physically connects the electronic device 1001 to the external electronic device (e.g., the electronic device 1002), for example, an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. The haptic module 1079 may include, for example, a motor, a piezoelectric element, or an electric stimulator.

The camera module 1080 may shoot a still image or a video image. According to an embodiment, the camera module 1080 may include, for example, at least one lens, an image sensor, an image signal processor, or a flash.

The power management module 1088 may be a module for managing power supplied to the electronic device 1001 and may serve as at least a part of a power management integrated circuit (PMIC).

The battery 1089 may be a device for supplying power to at least one component of the electronic device 1001 and may include, for example, a non-rechargeable (primary) battery, a rechargeable (secondary) battery, or a fuel cell.

The communication module 1090 may establish a wired or wireless communication channel between the electronic device 1001 and the external electronic device (e.g., the electronic device 1002, the electronic device 1004, or the server 1008) and support communication execution through the established communication channel. The communication module 1090 may include at least one communication processor operating independently from the processor 1020 (e.g., the application processor) and supporting the wired communication or the wireless communication. According to an embodiment, the communication module 1090 may include a wireless communication module 1092 (e.g., a cellular communication module, a short-range wireless communication module, or a GNSS (global navigation satellite system) communication module) or a wired communication module 1094 (e.g., an LAN (local area network) communication module or a power line communication module) and may communicate with the external electronic device using a corresponding communication module among them through the first network 1098 (e.g., the short-range communication network such as a Bluetooth, a WiFi direct, or an IrDA (infrared data association)) or the second network 1099 (e.g., the long-distance wireless communication network such as a cellular network, an internet, or a computer network (e.g., LAN or WAN)). The above-mentioned various communication modules 1090 may be implemented into one chip or into separate chips, respectively.

According to an embodiment, the wireless communication module 1092 may identify and authenticate the electronic device 1001 using user information stored in the subscriber identification module 1096 in the communication network.

The antenna module 1097 may include one or more antennas to transmit or receive the signal or power to or from an external source. According to an embodiment, the communication module 1090 (e.g., the wireless communication module 1092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1001 and the external electronic device 1004 through the server 1008 connected to the second network 1099. Each of the electronic devices 1002 and 1004 may be the same or different types as or from the electronic device 1001. According to an embodiment, all or some of the operations performed by the electronic device 1001 may be performed by another electronic device or a plurality of external electronic devices. When the electronic device 1001 performs some functions or services automatically or by request, the electronic device 1001 may request the external electronic device to perform at least some of the functions related to the functions or services, in addition to or instead of performing the functions or services by itself. The external electronic device receiving the request may carry out the requested function or the additional function and transmit the result to the electronic device 1001. The electronic device 1001 may provide the requested functions or services based on the received result as is or after additionally processing the received result. To this end, for example, a cloud computing, distributed computing, or client-server computing technology may be used.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 1040) including an instruction stored in a machine-readable storage media (e.g., an internal memory 1036 or an external memory 1038) readable by a machine (e.g., a computer). The machine may be a device that calls the instruction from the machine-readable storage media and operates depending on the called instruction and may include the electronic device (e.g., the electronic device 1001). When the instruction is executed by the processor (e.g., the processor 1020), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or created in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a camera;
a display;
a memory storing a plurality of captured images; and
a processor operatively connected to the camera, the display, and the memory,
wherein the processor is configured to:
obtain a live view image using the camera;
determine a first category to which at least one object included in the live view image belongs;
select, among the plurality of captured images, at least one first captured image corresponding to the first category;
determine preference information indicating a preference of a user for the selected at least one first captured image based on at least one object included in the selected at least one first captured image;
determine at least one image of which the preference is relatively high among the selected at least one first captured image;
display a first additional information of an augmented reality service based on the determined at least one image, the live view image, and a filtering object for determining a second additional information of the augmented reality service on the display;
in response to receiving a first user input selecting the filtering object,
display a list of at least one category to which the at least one object included in the selected at least one first captured image belongs on the display; and
in response to receiving a second user input selecting a second category from the list of at least one category,
select at least one second captured image corresponding to the second category,
display the second additional information of the augmented reality service based on the selected at least one second captured image and the live view image.

2. The electronic device of claim 1, wherein the memory stores each captured image and category information corresponding to a category to which an object included in each captured image in a manner of associating each captured image with the category information,
wherein the preference information is preference information for the category information,
wherein the processor is configured to:
select, among the plurality of captured images, the at least one first captured image corresponding to the first category based on the category information; and
determine the at least one image belonging to a category of which the preference is relatively high among the selected at least one first captured image based on the preference information.

3. The electronic device of claim 2, further comprising:
a communication module set to communicate with a server,
wherein the processor is configured to:
transmit the live view image to the server through the communication module; and
receive the category information about a category to which the at least one object included in the live view image belong from the server.

4. The electronic device of claim 3, wherein the category information about the category to which the at least one object included in the live view image belongs is determined based on a result of comparison, by the server, between the at least one object included in the live view image and an object stored in a database of the server.

5. The electronic device of claim 2, wherein the processor is configured to:
identify the category information about categories to which the at least one object included in the at least one first captured image belongs; and
determine preference information for the category information about the categories to which the at least one object included in the plurality of captured images belong using a frequency of appearances of the category information about the categories to which the at least one object included in the plurality of captured images belong.

6. The electronic device of claim 5, wherein the processor is configured to determine the preference information for the category information about the categories to which the at least one object included in the plurality of captured images belong by applying a weight value on a frequency of appearances of at least one category based on at least one of history information about creation, sharing, or editing of each captured image, or environment information corresponding to a time of creation of each captured image.

7. The electronic device of claim 6, wherein the history information includes at least one of search history information of each captured image, shared history information of each captured image, tag information of each captured image, and app information about an app created each captured image.

8. The electronic device of claim 6, wherein the environment information includes at least one of time information, date information, current location information, and weather information.

9. The electronic device of claim 2, wherein the processor is configured to:
identify at least one third category excluding the first category to which the at least one object included in the live view image belongs among a plurality of different categories of the at least one object included in the at least one first captured image based on category information of the at least one first captured image; and
determine the at least one image of which the preference is relatively high among the at least one third category as the first additional information based on the preference information.

10. The electronic device of claim 9, wherein the processor is configured to determine at least one image having a shared history, a search history, or a tagging history, or created using a screen capture function among the plurality of captured images as the first additional information.

11. The electronic device of claim 2, wherein the processor is configured to:
when the at least one first captured image includes a plurality of images, and preferences of the plurality of images are the same,
identify environment information at a time of capturing each of the plurality of images and environment information at a current time of obtaining the live view image, respectively; and
determine the at least one image among the plurality of images based on a relative similarity between the environment information at the time of capturing and the environment information at the current time.

12. The electronic device of claim 11, wherein the processor is configured to, when there is an image captured at a close location within a specified distance from a current location of the electronic device among the plurality of images, determine at least one image at the close location within the specified distance as the first additional information.

13. The electronic device of claim 2, wherein the processor is configured to:
when the at least one first captured image includes a plurality of images, and preferences of the plurality of images are the same,
identify current time information and current date information among capturing date and capturing time information and environment information of the plurality of images; and
determine at least one image relatively recently captured among the plurality of images as the first additional information.

14. The electronic device of claim 2, wherein the processor is configured to:
when the at least one first captured image includes a plurality of images, and preferences of the plurality of images are the same,
identify tones of the live view image and the plurality of images; and
determine at least one image relatively similar in tone to the live view image among the plurality of images.

15. The electronic device of claim 2, wherein the memory further stores a plurality of promotion information,
wherein the processor is configured to:
identify association between environment information of the plurality of captured images and category information of the plurality of captured images;
identify the user's taste corresponding to environment information and the category information based on the identified association;
determine promotion information corresponding to the user's taste among the plurality of promotion information based on environment information at a current time of obtaining the live view image; and
display the live view image and the promotion information on the display.

* * * * *